Sept. 25, 1923.  E. G. LEFEVER  1,468,910
BRAKE EQUALIZING DEVICE
Filed Jan. 9, 1922  3 Sheets-Sheet 3
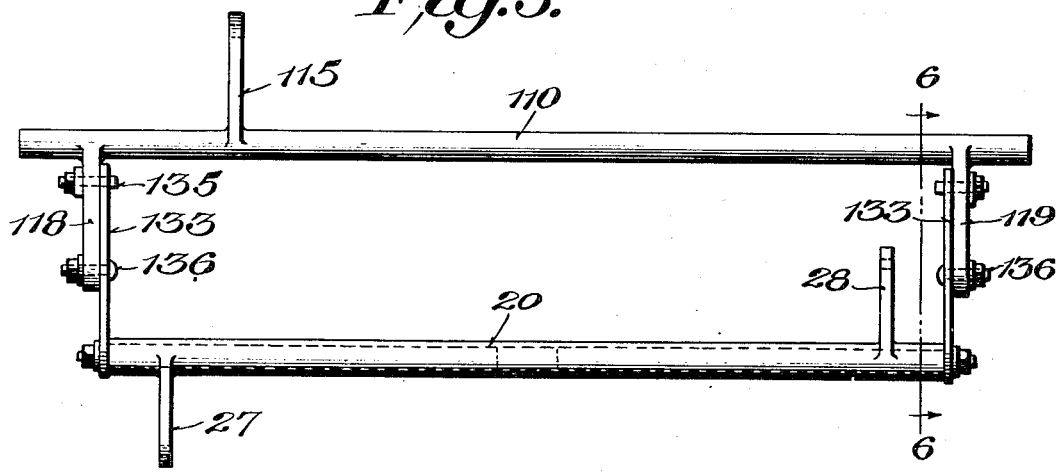
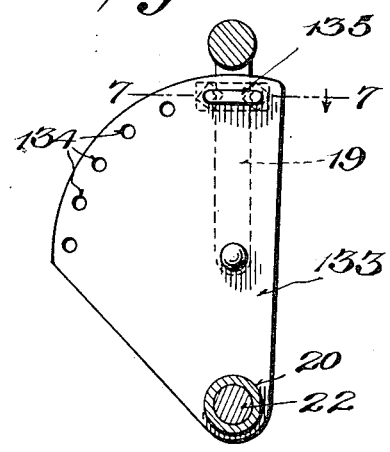
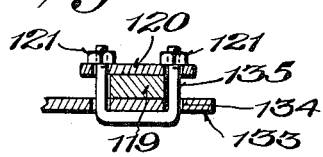
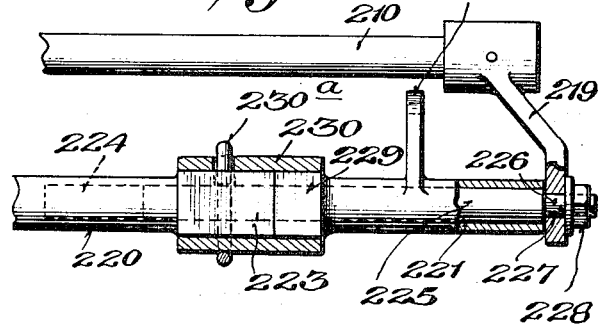
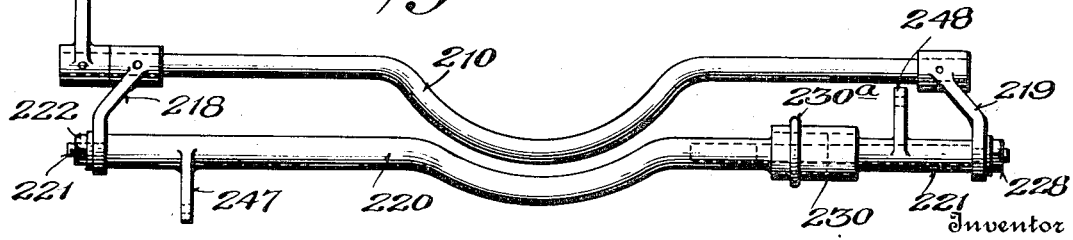

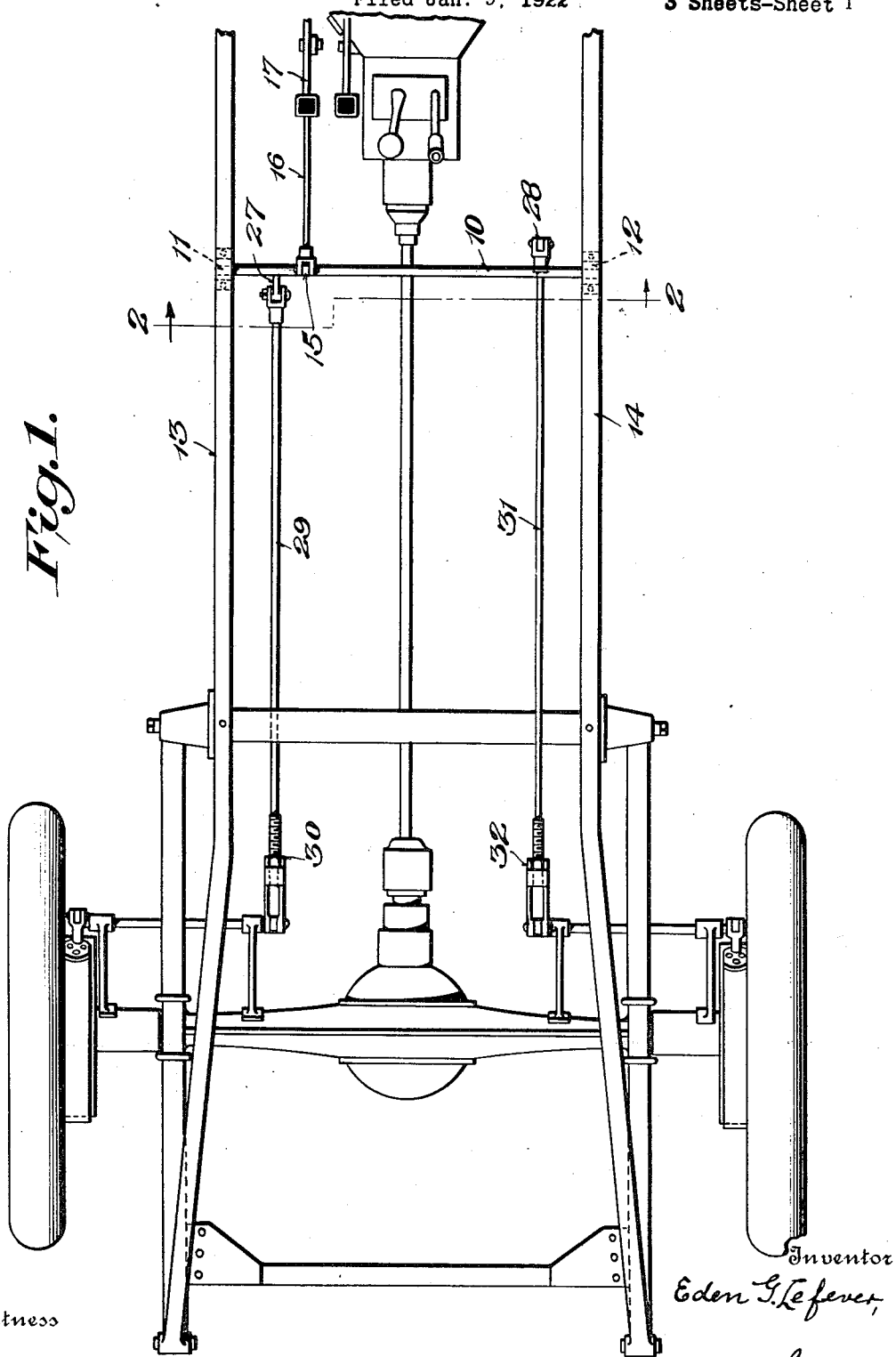

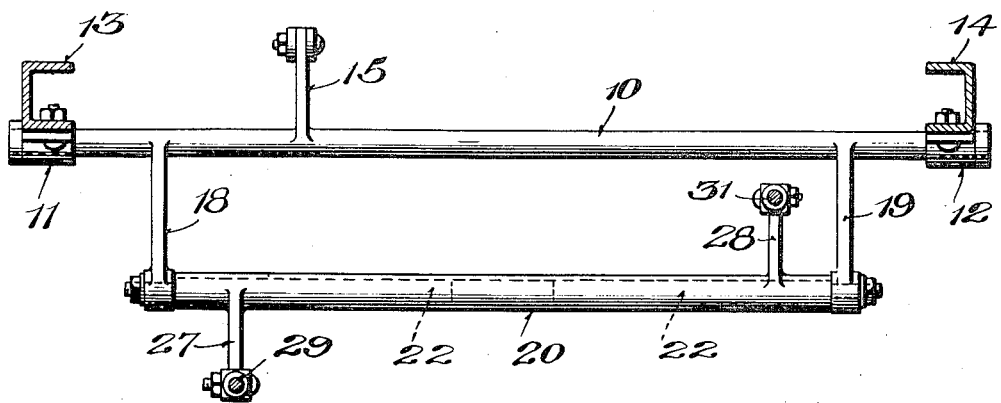
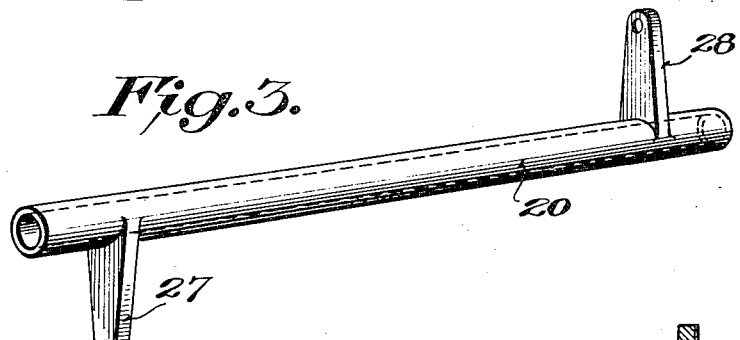
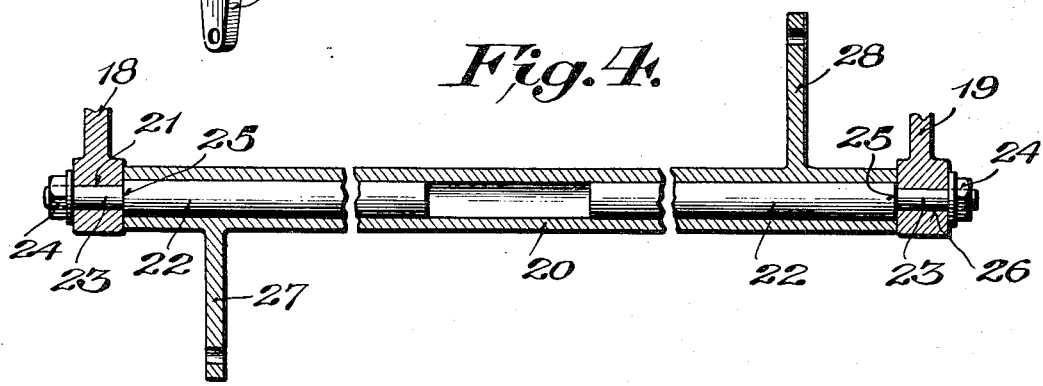

Patented Sept. 25, 1923.

1,468,910

UNITED STATES PATENT OFFICE.

EDEN G. LEFEVER, OF BOYERTOWN, PENNSYLVANIA.

BRAKE-EQUALIZING DEVICE.

Application filed January 9, 1922. Serial No. 528,050.

*To all whom it may concern:*

Be it known that I, EDEN G. LEFEVER, a citizen of the United States, and residing at Boyertown, Berks County, State of Pennsylvania, have invented certain new and useful Improvements in Brake-Equalizing Devices, of which the following is a specification.

The present invention relates to vehicles and more particularly to brake equalizing mechanism.

As is well recognized, it is desirable to apply the brakes to the wheels at the opposite ends of an axle with equal forces, so that the braking effect at both wheels will be alike and thereby eliminate skidding. According to this invention a device is provided so that the brakes at the opposite ends of an axle are applied with equal forces.

The objects and features of novelty of the invention will be apparent from the description taken in connection with the drawings in which—

Fig. 1 is a top plan view of a portion of a vehicle having the present invention embodied therein;

Fig. 2 is a sectional elevation taken substantially on the line 2—2 of Figure 1;

Fig. 3 is a perspective view of one of the members shown in Figure 2;

Fig. 4 is a sectional view through the member shown in Figure 3 illustrating the manner of mounting the same;

Fig. 5 is a view similar to Figure 2 showing a modified form of the invention;

Fig. 6 is a sectional view taken substantially on the line 6—6 of Figure 5;

Fig. 7 is a sectional view taken substantially on the line 7—7 of Figure 6;

Fig. 8 is a view similar to Figure 2 illustrating the invention as embodied in well known cars; and Fig. 9 is an enlarged view of a part of the mechanism shown in Figure 8, certain parts being in section.

Referring to the drawings and more particularly Figures 1 to 4 inclusive, a mechanism constructed in accordance with the present invention may comprise a rod 10 rotatively carried by the frame of the vehicle. As shown the rod 10 at its ends is mounted in bearings 11 and 12 secured to the frame members 13 and 14 respectively. The rod 10 is adapted to be turned or rotated by the operator of the vehicle. For this purpose it may be provided with an arm 15 connected by a link 16 to a lever 17 of the usual brake operating type. The member 10 pivotally carries another member for rotation about an axis eccentric to the rod 10. As shown the rod 10 has a pair of spaced arms 18 and 19 carrying the rod or member 20. For this purpose the rod 20 is hollow and each of the arms 18 and 19 at its free end has a spindle disposed within the bore of the rod 20. As shown the free end of the arm 18 is provided with the opening 21 and a spindle 22 has a reduced end 23 disposed in said opening, a nut 24 being screwed on the outside end of the reduced portion so that the arm 18 is clamped between the shoulder 25 on the spindle and the nut 24. A similar spindle is mounted in the opening 26 in the free end of the arm 19. The total length of the spindles between the arms is less than the length of the member 20. Hence the spindles may be retracted within the member 20 when it is desired to remove the latter.

As shown the pivoted or rotatable member 20 is provided with a pair of spaced oppositely projecting arms 27 and 28. The free end of the arm 27 is connected to the brake of one wheel in any suitable manner, as by means of the link 29 having any suitable mechanism 30 for adjusting its length. In a like manner the free end of the arm 28 is connected to operate the other brake by means of a link 31 having an adjustable device 32.

In applying the brakes the lever 17 is operated to turn the member 10. This swings the member 20 around the axis of the member 10 thereby pulling on the links 29 and 31 and applying the brakes. As the member 20 is pivotally mounted, the pull transmitted through one arm as 27 must balance the pull transmitted through the opposite arm 28. Hence the brakes are applied with equal forces.

In some vehicles no suitable mechanism is provided for adjusting the length of the links or rods operating the brakes. In Figures 5 to 7 inclusive a form of the invention is illustrated adapted to be employed in such vehicles, this form being provided with means for adjusting the brake applying mechanism. As shown the rod 110 corresponds to the rod 10 of the form previously described. It is pivotally mounted and has the substantially radial parallel arms 118 and 119. Each of these arms adjustably carries a sector plate 133. As shown the plates are provided with the apertures 134 spaced along an arc and a clip 135 has its legs passing through a pair of adjacent apertures and straddling the adjacent arm, a plate 120 and nuts 121 being provided to hold the clip. The free ends of the arms are bolted to the plates 133 by means such as the bolts 136. The member 20 is pivotally carried by the free ends of the plates 133 in the manner described in connection with the first form of the invention and the spaced oppositely projecting radial arms 27 and 28 are each connected to a brake. The position of the member 20 may be adjusted around the axis of the rod 110 by changing the clips 135 so that they will pass through different apertures 134. The rod 110 is provided with the operating arm 115. When this arm is turned the brakes will be applied with equal forces as described in connection with the first form of the invention. Of course the arrangement of the plates 133 could be reversed, that is, the plates could be nonadjustably secured to the arms 118 and 119 and the rod 20 pivoted in any one of the apertures 134.

In Figures 8 to 9 inclusive a form of the invention is illustrated particularly adapted to be employed in well known automobiles. The rod 210 is pivotally secured to the frame and has the spaced arms 218 and 219 carrying a rotatable member at their free ends. As shown this rotatable member comprises two sections 220 and 221. One end of the section 220 is reduced as at 221 and mounted in an aperture in the free end of arm 218, a nut 222 being screwed on the end thereof. The opposite end of the section 220 is squared as shown at 223 and it is provided with a central bore 224. The other section 221 is hollow and a rod 225 extends through the same and projects slightly into the bore 224. One end of the rod 225 is reduced as at 226 and is disposed in the aperture 227 in the free end of arm 219, a nut 228 being screwed on the end thereof. The end of the section 221 abutting the section 220 is squared as indicated at 229 and a coupling sleeve 230 couples the two sections 220 and 221 together, a wire 230ª or other suitable means being provided to hold the sleeve in position. When it is desired to adjust the brake mechanism to compensate the wear of the brakes or for other reasons, the coupling sleeve 230 is displaced longitudinally and one of the sections 220 or 221 turned relatively to the other and the sleeve then slid back over the squared sections. Although the portions 223 and 229 have been described as square, it is obvious that they might have other forms. The section 220 is provided with the radial arm 247 and the section 221 has the radial arm 248 projecting in a direction substantially opposite to that of arm 247. The free ends of the arms 247 and 248 are each connected to a brake in any suitable manner. The pivoted rod or member 210 may be rotated by a lever or arm 215.

Although three forms have been described in detail, it is to be understood that the invention is not thus limited but includes modifications and changes which come within the scope of the appended claims.

Having thus described the invention what I claim as new and desire to secure by Letters Patent is:

1. In a vehicle, a brake equalizing mechanism including in combination, a rotatively mounted rod, a second rotatable rod disposed parallel to and offset from the first rod and carried thereby, a pair of oppositely extending radial arms on the second rod, separate means connecting each arm to a brake, and means to rotate the first rod to control the brakes.

2. In a vehicle, a brake equalizing mechanism including in combination, a rotatable member, a second member pivoted on the first member for free rotation about an axis eccentric to the first member, a pair of brake operating members connected to said second member on opposite sides of its axis, and means to rotate the first member to control the brakes.

3. In a motor vehicle, in combination, a pair of coaxial wheels each having a brake, a pivoted member disposed with its axis parallel to the wheel axis, a second member freely pivoted on the first member eccentric thereto, means connecting the brakes to said second member on opposite sides of its axis, and means to turn the first member to thereby control the brakes.

4. In a motor vehicle, in combination, a pair of coaxial wheels each having a brake, a freely pivoted member disposed with its axis parallel to the wheel axes, means connecting the brakes to said member on opposite sides of its axis, and means to move said member bodily in a lateral direction to thereby control the brakes.

In testimony whereof I affix my signature.

EDEN G. LEFEVER.